(12) United States Patent
Kawase et al.

(10) Patent No.: US 8,604,811 B2
(45) Date of Patent: Dec. 10, 2013

(54) ELECTRICAL HEATING CATALYZER HAVING HONEYCOMB STRUCTURE

(75) Inventors: Tomoo Kawase, Aichi-ken (JP); Koji Sugiura, Kariya (JP)

(73) Assignee: Denso Corporation, Kariya (JP)

( * ) Notice: Subject to any disclaimer, the term of this patent is extended or adjusted under 35 U.S.C. 154(b) by 270 days.

(21) Appl. No.: 13/158,525

(22) Filed: Jun. 13, 2011

(65) Prior Publication Data

US 2011/0305601 A1    Dec. 15, 2011

(30) Foreign Application Priority Data

Jun. 11, 2010 (JP) .................. 2010-133551

(51) Int. Cl.
*G01R 27/08* (2006.01)
(52) U.S. Cl.
USPC .......................................... 324/713
(58) Field of Classification Search
None
See application file for complete search history.

(56) References Cited

U.S. PATENT DOCUMENTS

| | | | |
|---|---|---|---|
| 5,063,029 A | | 11/1991 | Mizuno et al. |
| 5,938,427 A | * | 8/1999 | Suzuki et al. ............... 431/208 |
| 6,065,957 A | * | 5/2000 | Kondo et al. ............... 431/116 |
| 6,475,655 B1 | * | 11/2002 | Nakanishi et al. ........... 429/424 |
| 7,610,761 B2 | * | 11/2009 | Carroni et al. ............... 60/777 |

FOREIGN PATENT DOCUMENTS

| | | |
|---|---|---|
| JP | H03-295184 | 12/1991 |
| JP | P2005-194935 A | 7/2005 |
| JP | P2008-014239 A | 1/2008 |
| JP | P2009-191681 A | 8/2009 |

OTHER PUBLICATIONS

Japanese Office Action dated May 1, 2012, issued in corresponding Japanese Application No. 2010-133551 with English translation.

* cited by examiner

*Primary Examiner* — Jermele M Hollington
*Assistant Examiner* — Trung Nguyen
(74) *Attorney, Agent, or Firm* — Nixon & Vanderhye P.C.

(57) ABSTRACT

A honeycomb body of a honeycomb structure is made of ceramic, and a plurality of electrodes are provided apart from one another on a surface of the honeycomb body. In the honeycomb body, energization is performed for each of a plurality of current paths Xa to Xc formed by the plurality of electrodes, thereby heating the honeycomb body. A controlling device detects heater current Ia, Ib, and IC that flow when a predetermined voltage is applied for each of the plurality of current paths Xa, Xb, and Xc, and controls an energization timing of each current path Xa to Xc based on the detection results.

15 Claims, 11 Drawing Sheets

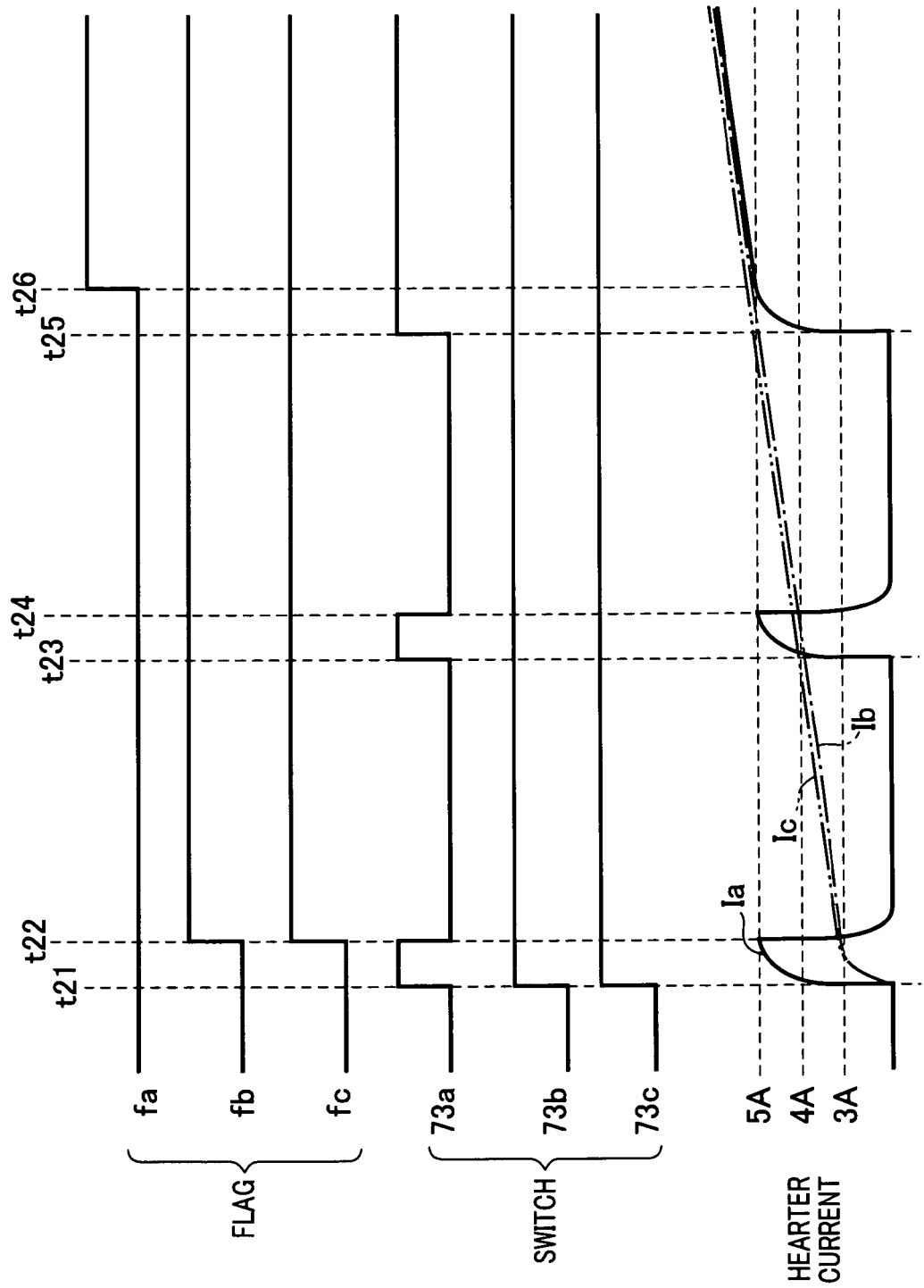

SW1=a
SW2=c

SW1=b
SW2=d

ELECTRICAL HEATING CATALYZER HAVING HONEYCOMB STRUCTURE

CROSS-REFERENCE TO RELATED APPLICATION

This application is based on and claims the benefit of priority from earlier Japanese Patent Application No 2010-133551 filed on Jun. 11, 2010 the description of which is incorporated herein by reference.

TECHNICAL BACKGROUND

1. Field of the Invention

The present invention relates to an electrical heating catalyzer, in particular, to an electrical heating catalyzer capable of uniformly heating base material thereof.

2. Description of the Related Art

Conventionally, a catalyzer is used as an exhaust emission control device for purifying exhaust from an engine. The catalyzer is configured by a catalyst, such as Pt, Pd, or Rh, being supported by a ceramic honeycomb body (base material), and is capable of achieving desired exhaust emission control performance by being held at a predetermined activation temperature (such as about 400° C.).

For example, as a catalyzer disclosed in JP-A-H3-295184, an electrical heating catalyzer (EHC) is proposed in which a pair of electrodes are provided in a honeycomb body, and the honeycomb body is heated by voltage being applied between the electrodes. More specifically, the honeycomb body is formed into a circular columnar shape by an electrically conductive ceramic, such as silicon carbide, and has numerous through-holes (cells) extending in a direction in which exhaust passes. The pair of electrodes in the form of thin films are provided on the outer peripheral surface of the honeycomb body in two positions that, for example, differ by 180 degrees with an axial center of the honeycomb body as reference. As a result of voltage being applied to the pair of electrodes, the honeycomb body is heated.

Early activation of the catalyzer is required to be achieved to enhance exhaust emission control performance in an engine, and therefore, electrical energy introduced to the honeycomb body during heating thereof has been increasing in recent years. For example, in some instances, a large-capacity battery is mounted in a hybrid car, enabling high power to be introduced to the honeycomb body. The honeycomb body may be able to be heated to about 500° C. in just 20 to 30 seconds.

On the other hand, in the electrical heating catalyzer, when energization is performed by voltage being applied to the pair of electrodes provided in the honeycomb body, variation is considered to occur in the current flowing through each section of the honeycomb body as a result of placement aspect of the electrodes, individual differences and aging of the honeycomb body, and the like. For example, the size of the current differs between a center section and an end section of the electrode, and energy (current) is concentrated in the end section of the electrode. In this instance, because the honeycomb body is not uniformly heated, thermal stress is concentrated locally, thus possibly leading to problems such as damage to the honeycomb body. Such problems are considered especially noticeable when the introduced energy is increased to achieve early activation (early temperature rise) of the catalyzer, as described above.

SUMMARY

An embodiment provides an electrical heating catalyzer capable of uniformly heating a base material while achieving rapid temperature rise.

In the electrical heating catalyzer according to the embodiment, in a honeycomb structure having a base material made of conductive ceramic and a plurality of electrodes, a plurality of current paths are formed in the base material by the plurality of electrodes, and the base material is heated by energization of each current path. In this instance, when an inter-electrode resistance of each current path differs, a difference in path-specific current when voltage is applied occurs, causing non-uniform temperatures in the base material.

Regarding this point, as a first aspect of the embodiment, a path-specific current that flows through the base material when a predetermined voltage is applied or an inter-electrode resistance in the base material is detected for each current path. Then, the path-specific current or the inter-electrode resistance of each current path is compared, and an energization timing for each current path is individually controlled based on comparison results. In this instance, as a result of comparison of the path-specific current or the inter-electrode resistance of each current path, variation in internal resistance of the base material among the current paths can be found, and the energization timing of each current path can be individually controlled taking into consideration the variation among current paths. Therefore, even when a difference in inter-electrode resistance of each current path occurs as a result of placement aspects of the electrodes, individual differences and aging of the base material, and the like before heating of the base material is started, heating can be performed to resolve the difference after heating is started, and temperature distribution in the base material can be made uniform. As a result, localized concentration of thermal stress in the base material can be suppressed. At this time, even when high power is introduced to the base material to achieve early activation, damage to the base material and the like can be suppressed. As a result, the base material can be uniformly heated while achieving rapid temperature rise.

As a second aspect of the embodiment, the base material is made of a ceramic having negative temperature coefficient (NTC) characteristics. A detecting means detects the path-specific current or the inter-electrode resistance at a heating-start timing at which heating of the base material is started. An energization controlling means controls an energization-start timing of each current path such that, among the plurality of current paths, a current path having a smaller path-specific current at the heating-start timing is energized first and a current path having a larger path-specific current is energized later, or a current path having a larger inter-electrode resistance at the heating-start timing is energized first and a current path having a smaller inter-electrode resistance is energized later.

In the base material having NTC characteristics, internal resistance gradually decreases (energization current increases) when temperature increases with the start of energization. When the size of inter-electrode resistance differs among the current paths, the current in a current path having the smaller inter-electrode resistance becomes larger than those of other current paths, and heat is concentrated in the region having the smaller inter-electrode resistance. Regarding this point, according to the above-described configuration, when the size of inter-electrode resistance differs among the current paths before heating of the base material is started, resistance value decreases in the current path having the larger inter-electrode resistance while resistance value is maintained in the current path having the smaller inter-electrode resistance, immediately after heating is started. Therefore, the difference in inter-electrode resistance can be resolved after heating of the base material is started, and temperature distribution in the base material can be made uniform.

As a third aspect of the embodiment, at a point where the path-specific current or the inter-electrode resistance of the current path of which energization has been started first becomes a same value as that of a path-specific current or a inter-electrode resistance of another current path of which energization has not been started, the energization controlling means starts energization of the other current path. In this instance, the path-specific currents or the inter-electrode resistances can be matched between the current path of which energization is started first and the current path of which energization is started later, after the latter energization, is started.

As a fourth aspect of the embodiment, based on a difference in path-specific current or inter-electrode resistance among the current paths at the heating-start timing, the energization controlling means decides a current path of which energization is to be started first, and decides an energization delay time for the current path of which energization is to be started later, based on a timing of the energization that is started first.

According to the above-described embodiment, the path-specific currents and the inter-electrode resistances can be matched by a simple method between the current path of which energization is started first and the current path of which energization is started later. For example, a relationship between the difference in path-specific current or inter-electrode resistance among the current paths and the energization delay time can be set in advance, and the energization delay time can be decided based on the relationship.

As a fifth aspect of the embodiment, the detecting means detects the path-specific current or the inter-electrode resistance for each of the plurality of current paths at a predetermined detection interval after heating of the base material has been started. The energization controlling means performs a comparison of the path-specific currents or the inter-electrode resistances detected at each predetermined detection interval and controls energization timing of each current path based on the comparison result.

According to the above-described configuration, after the heating of the base material is started and a portion of the current path is being energized, while the inter-electrode resistance is gradually changing as a result of the energization, energization of current paths of which energization has not been started is successively started based on comparison of the path-specific current or the inter-electrode resistance between the current path of which energization has already been started and current paths of which energization has not been started. For example, when two or more current paths of which energization has not yet been started are present after heating of the base material is started, whether or not energization is permitted for the current paths of which energization has not been started is judged based on the comparison, and energization is started every time energization is permitted.

As a sixth aspect of the embodiment, the detecting means, when detecting the path-specific current, detects the path-specific current by energizing each current path for an energization period during which the path-specific current can be detected and temperature change in the base material does not occur.

When the path-specific current of each current path is detected, because energization is not subsequently immediately started for all current paths, temperature rise in the base material caused by temporary energization during detection of the path-specific current is not desirable. Regarding this point, the path-specific currents are detected by energization of each current path over an energization period during which the path-specific currents can be detected and temperature change in the base material does not occur, thereby suppressing unnecessary temperature rise in the base material. Specifically, the energization period is 3 msec or less and is, for example, 1 msec.

As a seventh aspect of the embodiment, the electrical heating catalyzer is applied to a vehicle hybrid system including a motor and an engine as power sources, and the honeycomb structure is provided in an exhaust system of the engine. The energization controlling means performs heating of the base material during a period after a vehicle is started by the motor and before the engine is started.

In the vehicle hybrid system, in general, operation of the engine is stopped when the vehicle starts moving and during low speeds, and the motor runs the vehicle. Therefore, during vehicle-startup when the vehicle starts moving, a running period is present during which the vehicle is driven only by the motor. Heating of the electrical heating catalyzer is performed taking advantage of this period. In this instance, the base material being uniformly heated while achieving rapid temperature rise, as described above, is considered very beneficial in achieving reduced emission in the vehicle hybrid system.

In addition, in the vehicle hybrid system, a high-voltage battery capable of being charged to a high voltage of, for example, 200V or more is used. Regarding this point as well, early and favorable temperature rise in the electrical heating catalyzer can be actualized.

As an eighth aspect of the embodiment, the plurality of current paths are configured to include current paths extending in mutually intersecting directions. The electrical heating catalyzer includes a switching controlling means for performing switching of a current path to be energized at each time among the current paths extending in mutually intersecting directions, among the plurality of current paths.

In other words, when energization of the base material is performed over a plurality of current paths, depending on the placement of electrodes, the number and positions of the current paths, and the like, uneven heating occurs in the base material, resulting in non-uniform temperatures. Regarding this point, according to the above-described configuration, because the current path to be energized can be switched each time among the plurality of current paths extending in mutually intersecting directions, uneven heating of the base material can be suppressed. In other words, when a plurality of current paths are provided such as to extend in the same direction, portions through which current does not easily flow (in other words, portions that are not easily heated) are formed, such as between the current paths. As a result of switching being performed accordingly among the mutually intersecting current paths as described above, portions through which current does not easily flow (in other words, portions that are not easily heated) are no longer easily formed. As a result, the base material can be uniformly heated.

As a ninth aspect of the embodiment, the base material is formed into a circular columnar shape. The plurality of current paths include a first current path extending in an axial direction of the base material and a second current path extending in a radial direction of the base material, as the current paths extending in mutually intersecting directions. The switching controlling means performs switching of the current path to be energized each time between the first current path and the second current path.

According to the above-described configuration, portions through which current does not easily flow (in other words, portions that are not easily heated) are eliminated in the base material having a circular columnar shape, and uniform heating of the overall base material can be achieved.

BRIEF DESCRIPTION OF THE DRAWINGS

In the accompanying drawings:

FIG. 2A and FIG. 2B are diagrams of a configuration of a honeycomb structure, in which FIG. 2A is a perspective view of the overall configuration and FIG. 2B is a cross-sectional view in an axial direction;

FIG. 3A and FIG. 3B are diagrams of an overview of a catalyst energization system, in which FIG. 3A is an overall circuit diagram of the catalyst energization system and FIG. 3B is a more detailed circuit diagram thereof;

FIG. 8 is a time chart for explaining in further detail energization control of the honeycomb body;

DETAILED DESCRIPTION OF THE PREFERRED EMBODIMENTS

Figure 1:
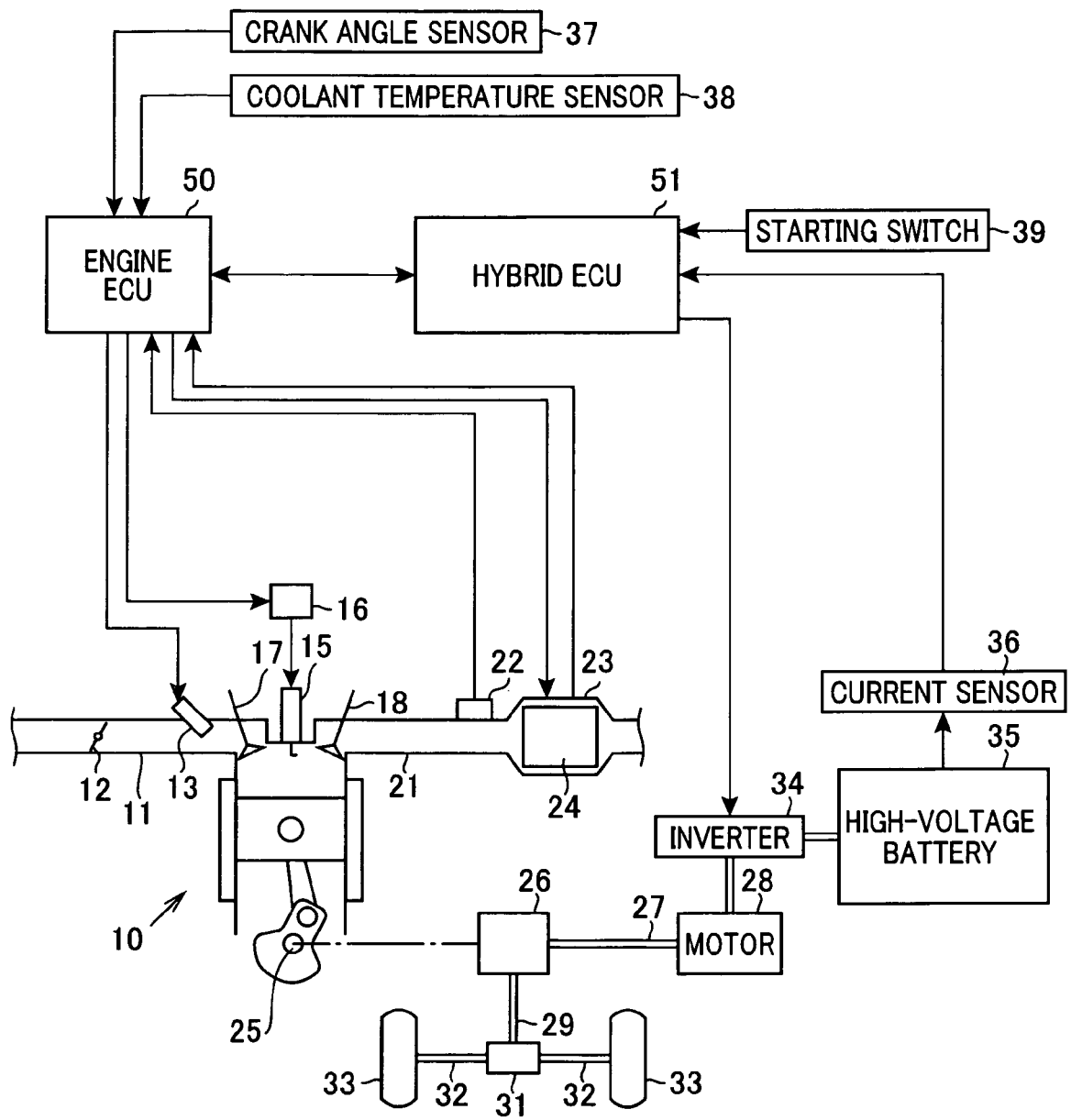
FIG. 1 is a configuration diagram of an overview of a vehicle control system according to an embodiment of the present invention.

An embodiment will hereinafter be described with reference to the drawings. According to the present embodiment, a control device in a vehicle control system of a hybrid car that uses an engine and a motor as power sources is specified. In the vehicle control system, an engine electronic control unit (engine ECU) and a hybrid electronic control unit (hybrid ECU) are provided. With the engine ECU serving as the core, fuel injection amount control, ignition timing control, and the like are performed in the engine. With the hybrid ECU serving as the core, motor control and overall system control including motor control are performed. FIG. 1 is a configuration diagram of an overview of the overall vehicle control system.

In FIG. 1, an engine 10 is a spark-ignition-type multicylinder gasoline engine. An electrically driven throttle valve 12 is provided in an intake pipe 11, and an injector 13 serving as a fuel injection means is provided in an engine intake port connected to the intake pipe 11. As an ignition means of the engine 10, an ignition plug 15 is provided in each cylinder of the engine 10, and an igniter 16 that applies a high voltage for ignition is provided in the ignition plug 15. In addition, an intake valve 17 is provided in the intake port and an exhaust valve 18 is provided in an exhaust port.

In an exhaust pipe 21, an air fuel (A/F) sensor 22 serving as an oxygen concentration sensor that detects oxygen concentration within exhaust is provided, and a catalytic converter 23 serving as an exhaust emission control device is provided downstream from the A/F sensor 22. The catalytic converter 23 has, for example, a three-way catalyst and purifies harmful components (HC, CO, and $NO_x$) within the exhaust when the exhaust passes through the catalytic converter 23. In addition, the catalytic converter 23 configures a so-called electrical heating catalyzer (EHC) configured such that a honeycomb structure 24 having a plurality of heating electrodes is housed within a cylindrical catalyst case. Details thereof will be described hereafter.

A power distributing device 26 using planetary gears is connected to an output shaft 25 of the engine 10. A motor 28 capable of being driven as an electrical motor and a power generator is connected to the power distributing device 26 with a gear shaft 27 therebetween. Wheels (drive wheels) 33 are connected to the power distributing device 26 with an output shaft 29, a differential gear 31, and drive shafts 32 therebetween. As a result, power from the engine 10 and power from the motor 28 can be outputted to the same drive shaft 32.

The motor 28 is connected to a high-voltage battery 35 with an inverter 34 therebetween. When the motor 28 is driven as the power generator, power generated by the motor 28 is used to charge the high-voltage battery 35 after the power is converted from alternating-current to direct-current by the inverter 34. On the other hand, when the motor 28 is driven as the electrical motor, power from the high-voltage battery 35 is supplied to the motor 28 via the inverter 34. State of charge (SOC) of the high-voltage battery 35 is calculated based on charge and discharge currents detected by a current sensor 36. The voltage of the high-voltage battery 35 is, for example, about 200V.

An engine ECU 50 and a hybrid ECU 51 are each configured mainly by a microcomputer (referred to, hereinafter, as a microprocessor) composed of known central processing unit (CPU), read-only memory (ROM), random access memory (RAM), and the like As a result of various control programs stored in the ROM being run, various types of control related to driving the engine 10 and the vehicle can be performed.

Specifically, the engine ECU 50 receives input of detection signals from various sensors that detect an operating state of the engine 10, such as a crank angle sensor 37 that outputs a rectangular crank angle signal at every predetermined crank angle of the engine 10, and a coolant temperature sensor 38 that detects the temperature of an engine coolant. Based on the various signals, the engine ECU 50 calculates the fuel injection amount, the ignition timing, and the like, and controls driving of the injector 13 and the igniter 16. The engine ECU 50 is also electrically connected to the hybrid ECU 51, and controls the engine 10 based on control signals from the hybrid ECU 51.

The hybrid ECU 51 receives input of detection signals from a starting switch 39, the current sensor 36, and various sensors that detect various pieces of information related to operation of the vehicle. Based on the various signals, the hybrid ECU 51 controls driving of the motor 28, the inverter 34, and the like. In addition, the hybrid ECU 51 exchanges various control signals, various pieces of data and the like with the engine ECU 50, controls the engine 10 and the motor 28 in a vehicle-running mode taking into consideration fuel efficiency of the engine 10, and performs idle-stop control.

Figure 2A:
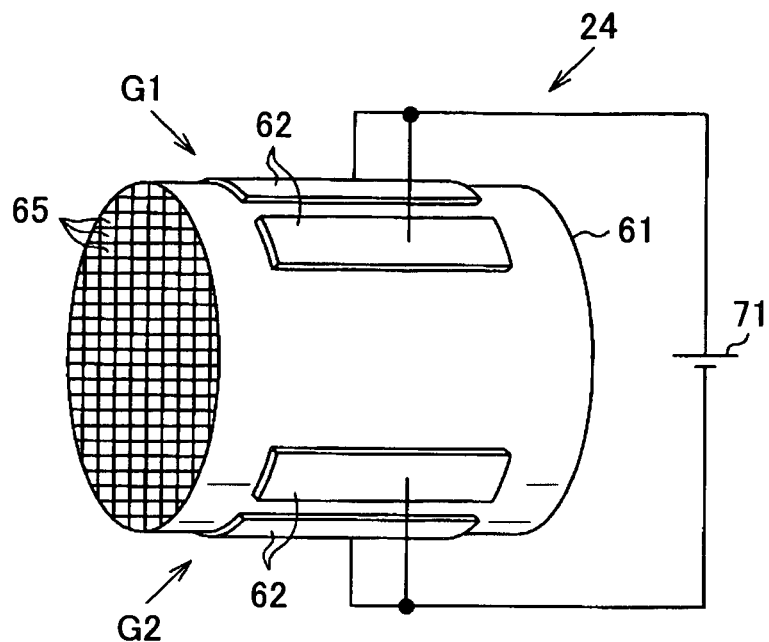
Figure 2B:
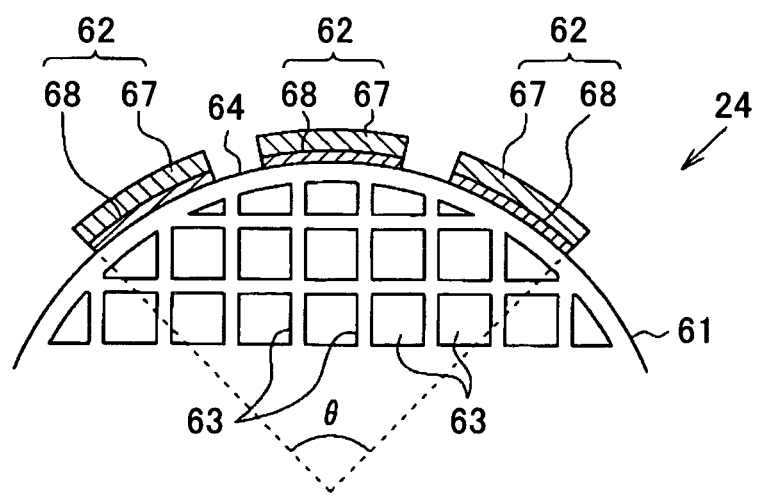

Next, the electrical heating catalyzer will be described in detail. FIG. 2A and FIG. 2B are diagrams of the configuration of the honeycomb structure 24 of the catalytic converter 23. FIG. 2A is a perspective view of the overall configuration, and FIG. 2B is a cross-sectional view in an axial direction.

The honeycomb structure 24 has a honeycomb body 61 serving as a base material composed of a porous, electrically conductive ceramic of which the main component is silicon carbide (SiC), and a plurality of electrodes 62 composed of a metal layer provided on the surface of the honeycomb body 61. The honeycomb body 61 has porous partition walls 63 arranged in a square grid, and a cylindrical outer peripheral wall 64 surrounding the outer peripheral side surface thereof. Numerous cells 65 extending in the axial direction are formed between the partition walls 63. The partition wall 63 supports a three-way catalyst composed of Pt, Pd, Rh, and the like. The honeycomb body 61 forms a circular columnar shape having, for example, a diameter of ø93 mm and a height of 100 mm. The thickness of the partition wall 63 is 170 µm, the thickness of the outer peripheral wall 64 is 300 µm, and a pitch width of the cells 65 is 1100 µm. The porosity of the honeycomb body 61 is 40% and the mean pore size is 10 µm.

The electrode 62 contains at least Cr and Fe, and is composed of a surface metal layer 67 of which the main component is Cr or Fe, and a diffusion layer 68 made of a metal silicide formed in a border portion between the electrode 62 and the honeycomb body 61. More specifically, the surface metal layer 67 is made of Cr-40Fe alloy, and Cr silicide and Fe silicide are formed in the diffusion layer 68. The thickness of the surface metal layer 67 and the diffusion layer 68 is 30 µm.

The plurality of electrodes 62 are composed of two electrode groups (a first electrode group G1 and a second electrode group G2) provided in positions symmetrical by 180 degrees in relation to an axial center of the honeycomb body 61. Each electrode group G1 and G2 is provided with three electrodes 62. According to the present embodiment, an angle formed by each electrode group G1 and G2 in relation to the axial center of the honeycomb body 61 (angle formed by respective outer end portions of the electrodes on the left and right sides) is 90 degrees.

The plurality of electrodes 62 also configure a plurality of electrode pairs, the electrode pair being a pair of electrodes opposing each other with the honeycomb body 61 therebetween. The honeycomb body 61 is heated by voltage being applied to each electrode pair. According to the present embodiment, three electrode pairs are formed, and the overall honeycomb body 61 is heated by energization being performed for each electrode pair. Here, the honeycomb body 61 containing silicon carbide as the main component has negative temperature coefficient (NTC) characteristics, and resistance value gradually decreases as the temperature of the honeycomb body 61 rises.

Figure 3B:
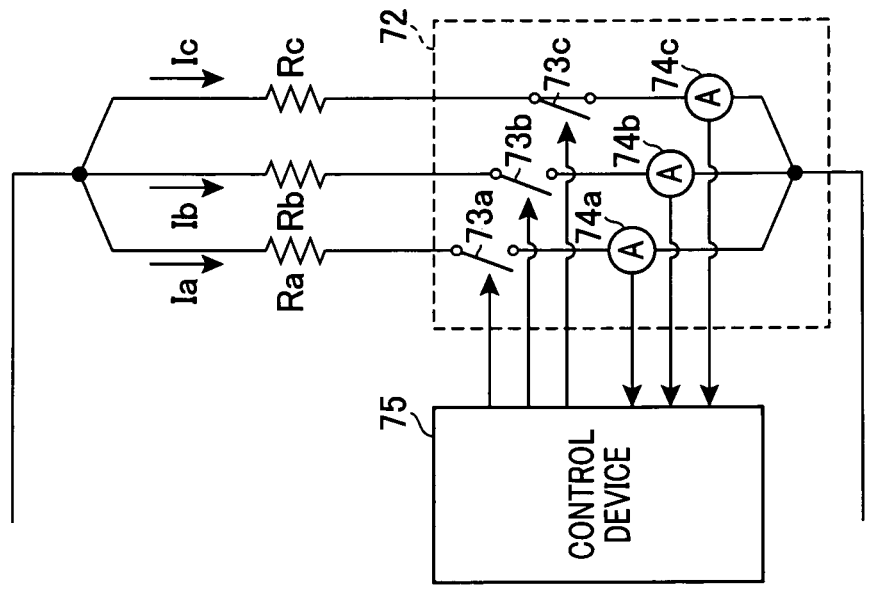
Figure 3A:
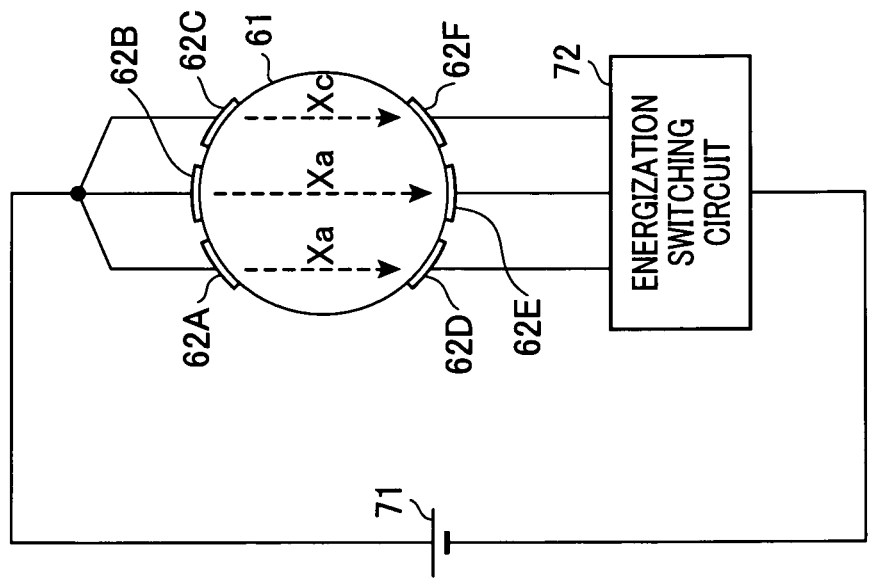

Next, an electrical configuration related to electrical heating of the catalytic converter 23 will be described. FIG. 3A and FIG. 3B are diagrams of an overview of a catalyst energization system. FIG. 3A is an overall circuit diagram of the catalyst energization system and FIG. 3B is a detailed circuit diagram thereof. In FIG. 3A and FIG. 3B, the six electrodes 62 provided on the outer surface of the honeycomb body 61 are respectively indicated as electrodes 62A, 62B, 62C, 62D, 62E, and 62F. In this instance, the electrodes 62A to 62C belong to the first electrode group G1, and the electrodes 62D to 62F belong to the second electrode group G2.

As shown in FIG. 3A, among the six electrodes 62, the electrodes 62A to 62C belonging to the first electrode group G1 are connected to the positive side of a power supply 71, and the electrodes 62D to 62F belonging to the second electrode group G2 are connected to the negative side of the power supply 71 with an energization switching circuit 72 therebetween. The power supply 71 is the high-voltage battery 35 in FIG. 1.

Here, the electrodes 62A and 62D, the electrodes 62B and 62E, and the electrodes 62C and 62F each form an electrode pair. When voltage is applied to the electrode pairs, current flows between the electrodes by passing through current paths Xa, Xb, and Xc, respectively, However, in this instance, resistance between the electrodes (inter-electrode resistance) in each electrode pair is considered to differ among the current paths Xa to Xc For example, among the three current paths Xa to Xc, the inter-electrode resistance of the current path Xb passing through the axial center of the honeycomb body 61 is considered to be higher because its path length is longer than those of the other current paths Xa and Xc. Reasons for the difference in inter-electrode resistance among the current paths Xa to Xc are considered attributed to the shape and size of the electrodes 62, and individual differences and aging of the honeycomb body 61, in addition to difference in current-path length.

When variation in inter-electrode resistance occurs among the current paths as described above, differences occur in the currents flowing through the current paths Xa to Xc when voltage is simultaneously applied to the electrode pairs, resulting in non-uniform heating temperatures in the honeycomb body 61. In particular, the difference in current among the electrode pairs is considered to be noticeable because the resistance value of the honeycomb body 61 decreases with the temperature rise after voltage application is started, as a result of the honeycomb body 61 having NTC characteristics.

Therefore, according to the present embodiment, energization timing for each electrode pair is individually controlled by the energization switching circuit 72. As a result, uniform heater current for each electrode pair, and thus, uniform heating temperature in the honeycomb body 61 can be achieved.

In addition, according to the present embodiment, the present invention is applied to a vehicle hybrid system. In the vehicle hybrid system, operation of the engine is stopped and the motor runs the vehicle during a running zone in which operation of the engine becomes inefficient, such as when the vehicle starts moving and during low speeds. In other words, during vehicle-startup when the vehicle starts moving, a running period is present during which the vehicle is driven only by the motor. According to the present embodiment, heating of the electrical heating catalyzer is performed taking advantage of this running period. In this instance, the catalytic converter 23 is required to be heated to an activation temperature (such as 500° C.) within a predetermined amount of time after the vehicle is started (after the motor is started) and before the engine is started. The catalytic converter 23 is required to be appropriately heated even under a requirement for early temperature rise such as this.

In FIG. 3B, regarding the three current paths Xa to Xc, the inter-electrode resistances are resistances Ra, Rb, and Rc, and the currents (path-specific currents) that flow when voltage is applied are heater currents Ia, Ib, and Ic, respectively. The energization switching circuit 72 switches each of three current paths Xa to Xc between a connected state and a cutoff state, and switches 73a, 73b, and 73c, and ammeters 74a, 74b, and 74c are respectively provided on the current paths Xa to Xc. The switches 73a to 73c are each configured by a switching element composed of a metal-oxide-semiconductor field-effect transistor (MOSFET) or the like. In this instance, in the current paths Xa to Xc, the ammeter 74a detects the heater current Ia when the switch 73a is turned ON, the ammeter 74b detects the heater current Ib when the switch 73b is turned ON, and the ammeter 74c detects the heater current Ic when the switch 73c is turned ON.

The heater currents Ia to Ic respectively detected by the ammeters 74a to 74c are inputted into a control device 75. The control device 75 performs heater energization control by ON/OFF control (such as pulse width modulation [PWM] control) of each switch 73a to 73c, based on the heater currents Ia to Ic. According to the present embodiment, the control device 75 is configured by the CPU within the engine ECU 50 in FIG. 1.

Figure 4:
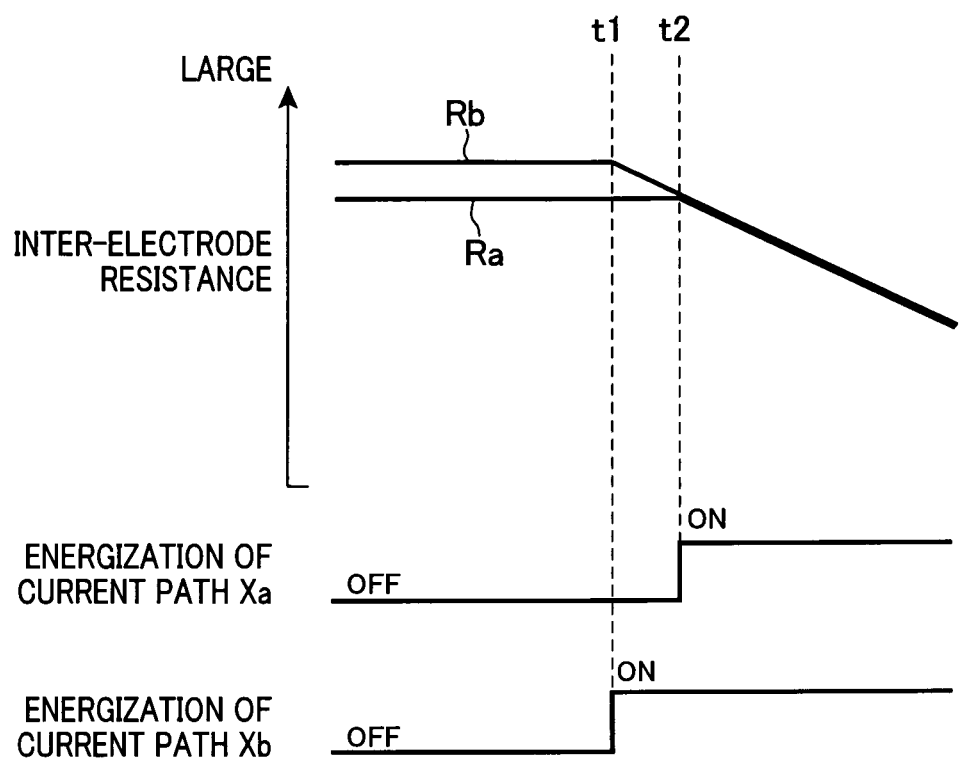
FIG. 4 is a time chart of an overview of heater energization control.

An overview of the heater energization control will be described with reference to a time chart in FIG. 4. For simplicity, FIG. 4 shows changes in the inter-electrode resistances Ra and Rb and energization ON/OFF timings for the current path Xa including the electrodes 62A and 62D and the current path Xb including the electrodes 62B to 62E, among the three current paths Xa to Xc.

Before timing t1, heater energization has not been started and the honeycomb body 61 is in a cooled state. In this state, a relationship between the inter-electrode resistances Ra and Rb is Ra<Rb. When current is simultaneously sent through the current paths Xa and Xb at timing t1 while in this state, current deviation occurs. Therefore, at timing t1 that is the energization-start timing, energization is started for only the current path Xb that has the larger inter-electrode resistance of the two current paths Xa and Xb. Then, the inter-electrode resistance Rb decreases with the energization of the current path Xb, and energization is also started for the current path Xa at timing t2 when Rb=Ra. The period from t1 to t2 is a delay period over which the start of energization of the current path Xa is delayed in relation to the start of energization of the current path Xb. In this instance, as a result of the inter-electrode resistances of the current paths being matched at the start of heating of the honeycomb body 61, variation among the heater current of each current path can be suppressed.

Figure 5:
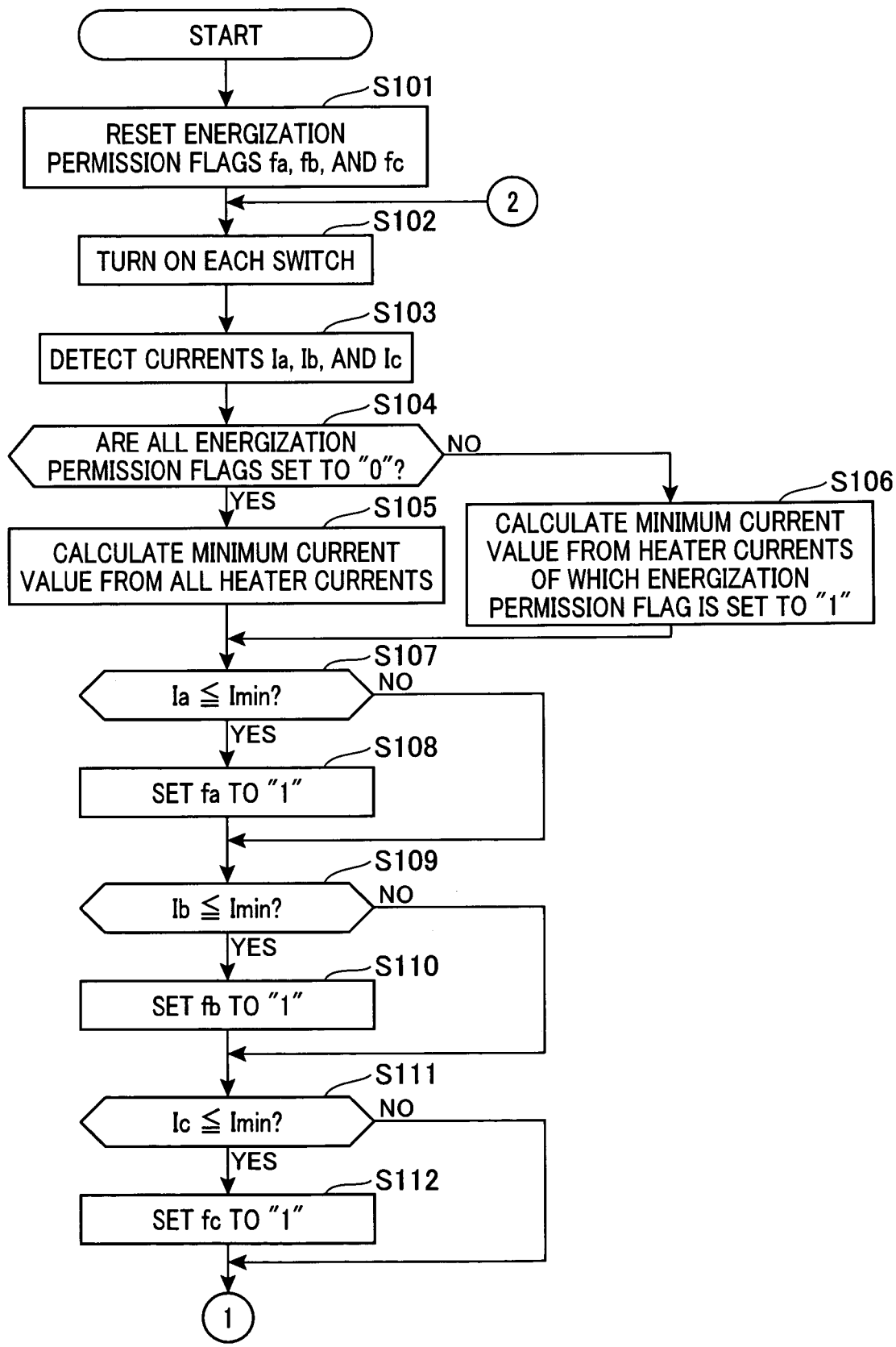
FIG. 5 is a flowchart of procedures performed in heater energization control.
Figure 6:
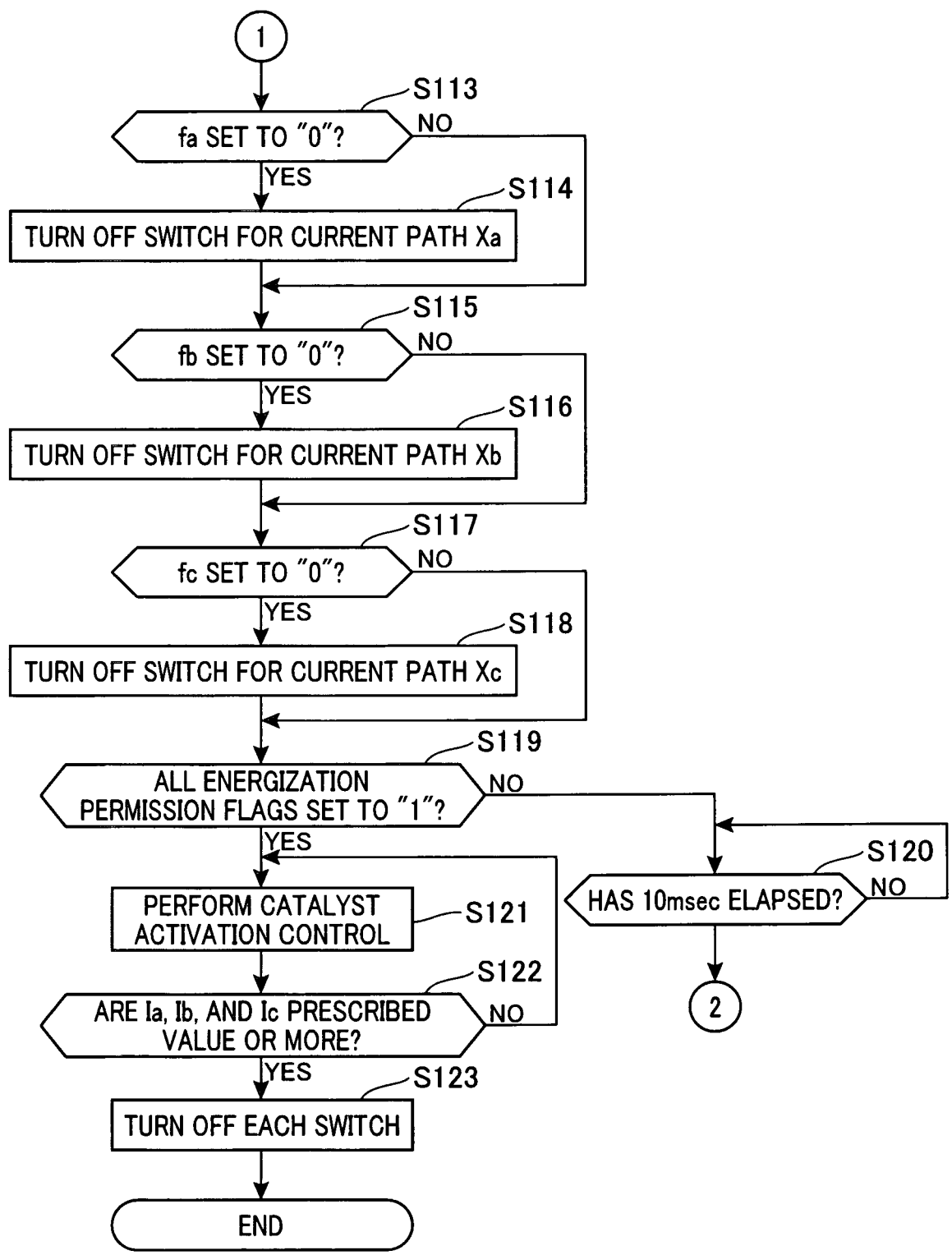
FIG. 6 is a flowchart of procedures performed in heater energization control following these in FIG. 5.

Next, a heater energization control process of the honeycomb structure 24 performed by the engine ECU 50 (the control device 75 in FIG. 3) will be described. FIG. 5 and FIG. 6 are flowcharts of procedures performed in heater energization control. The heater energization control process is performed by the engine ECU 50 after a vehicle starting switch is turned ON, or in other words, after the vehicle system is turned ON.

In FIG. 5, at Step S101, the engine ECU 50 resets all energization permission flags fa, fb, and fc respectively set for the current paths Xa to Xc (for each heater electrode pair) to 0. Next, at Step S102, the engine ECU 50 turns ON all switches 73a to 73c respectively provided for the current paths Xa to Xc. At subsequent Step S103, the engine ECU 50 detects the respective heater currents Ia, Ib, and Ic of the current paths Xa to Xc. In this instance, the heater currents Ia to Ic should be detected after the elapse of a waiting period of at least about 1 msec to enable accurate detection of the heater currents Ia to Ic after an ON command from the engine ECU 50.

Then, at Step S104, the engine ECU 50 judges whether or not all energization permission flags fa, fb, and fc are set to "0". Because all energization permission flags fa, fb, and fc are set to "0" the first time the process is performed after power has been turned ON, the engine ECU 50 proceeds to Step S105, and stores the smallest of the heater currents Ia to Ic of the current paths Xa to Xc as a minimum current value Imin. On the other hand, during second and subsequent times the process is performed after power has been turned ON, the engine ECU 50 proceeds to Step S106 and stores the smallest of the heater currents of the current paths of which the energization permission flag is set to "1" as the minimum current value Imin.

Then, at Step S107 to Step S112, the engine ECU 50 sets to "1" the energization permission flag of a current path, among the current paths Xa to Xc, of which the heater current is the current minimum current value Imin or less. In other words, the engine ECU 50 sets the energization permission fa to "1" when (Step S107 and Step S108), sets the energization permission flag fb to "1" when Ib≤Imin (Step S109 and Step S110), and sets the energization permission flag fc to "1" when Ic≤Imin (Step S111 and Step S112)

Then, at Step S113 to Step S118 in FIG. 6, the engine ECU SD turns OFF the switch of which the energization permission flag is currently set to "0" (the switch of the current path for which energization is not permitted), among the switches 73a to 73c of the current paths Xa to Xc. In other words, the engine ECU 50 turns OFF the switch 73a when the energization permission flag fa is set to "0" (Step S113 and Step S114), turns OFF the switch 73b when the energization permission flag fb is set to "0" (Step S115 and Step S116), and turns OFF the switch 73c when the energization permission flag fc is set to "0" (Step S117 and Step S118).

Then, at Step S119, the engine ECU 50 judges whether or not all energization permission flags fa to fc are set to "1". When judged NO, the engine ECU 50 proceeds to Step S120. At Step S120, the engine ECU 50 judges whether or not a predetermined amount of time (10 msec according to the present embodiment) has elapsed from the switch-ON process at Step S102, and when judged YES, returns to Step S102 in FIG. 5

When judged YES at Step S119, the engine ECU 50 proceeds to Step S121 and performs catalyst activation control, such as by performing temperature rise control with energization duty at 100%. The catalyst activation control is continuously performed until the heater currents Ia to Ic reach a prescribed value equivalent to a catalyst target temperature or more (until YES judgment is made at Step S122). The catalyst target temperature is, for example, about 500° C. Finally, at Step S123, the engine ECU 50 turns OFF all switches 73a to 73c. As a result, temperature rise control of the catalytic converter 23 is completed.

Figure 7:
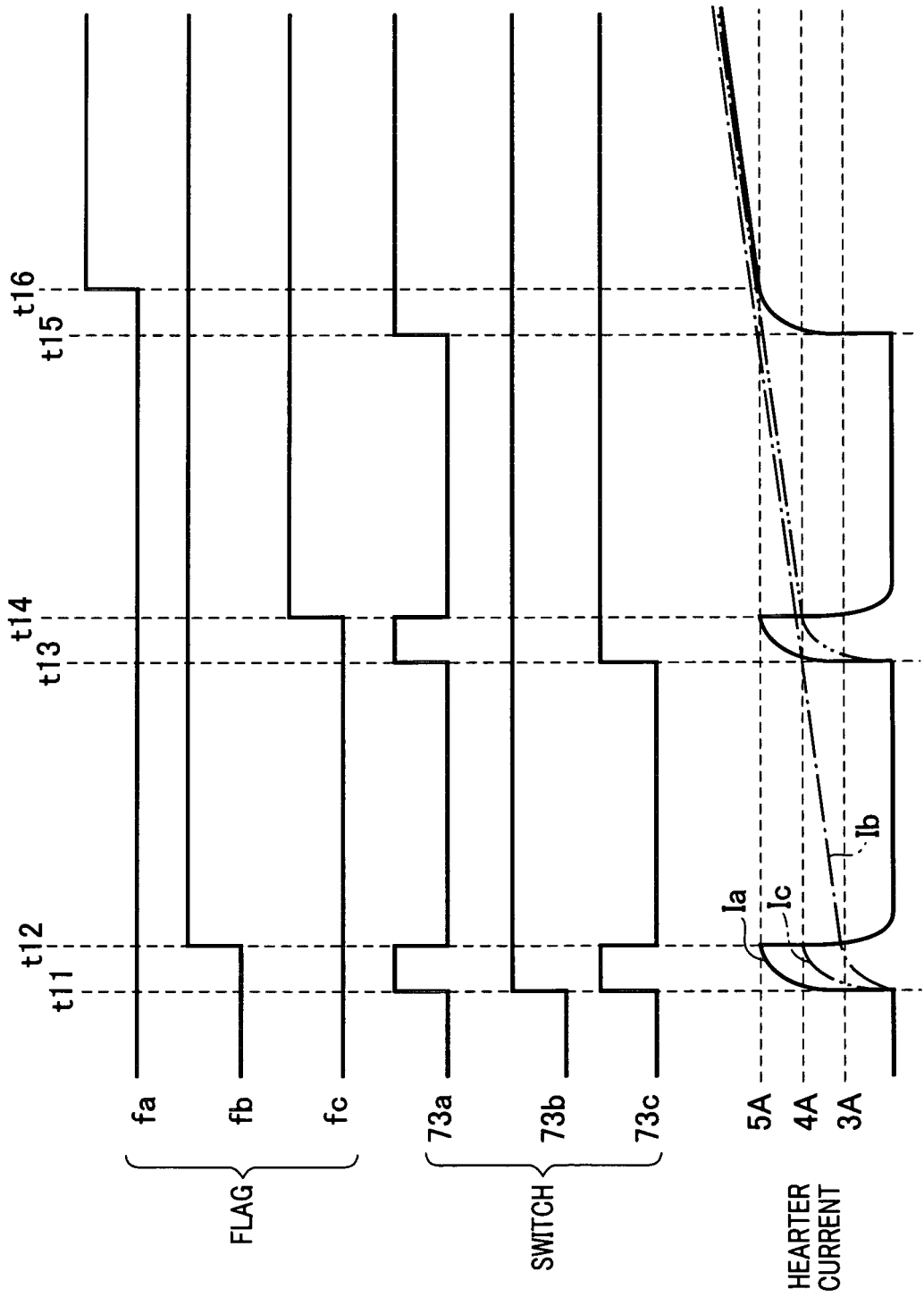
FIG. 7 is a time chart for explaining in further detail energization control of a honeycomb body.

Next, energization control of the honeycomb body 61 performed based on the above-described flowcharts will be described in detail with reference to FIG. 7 and FIG. 8. FIG. 7 and FIG. 8 both show an aspect of energization control from a cooled state FIG. 7 shows when the heater currents Ia, Ib, and Ic in the cooled state are respectively (5 A, 3 A, and 4 A) FIG. 9 shows when the heater currents Ia, Ib, and Ic in the cooled state are respectively (5 A, 3 A, and 3 A).

In FIG. 7, at timing t11 at which heating of the honeycomb body 61 is started, the initial heater energization process is started. Specifically, at timing t11, all energization permission flags fa, fb, and fc are reset and all switches 73a to 73c of the current paths Xa to Xc are turned ON. Then, each heater current Ia to Ic changes and increases at once to roughly Ia=5 A, Ib=3 A, and Ic=4 A.

Then, at timing t12, the initial heater currents Ia, Ib, and Ic are detected, and "Ib=3 A" is stored as the minimum current value Imin. At this same timing t12, only the energization permission flag fb, among the energization permission flags fa to fc, is set to "1", and the switches 73a and 73c, among the switches 73a to 73c, are turned OFF. Therefore, after timing t12, only the heater current Ib continues flowing, and the other heater currents Ia and Ic become zero. At this time, as a result of the flow of heater current Ib, the honeycomb body 61 is heated at the energized portion, causing decrease in internal resistance of the honeycomb body 61. With the decrease in internal resistance, the heater current Ib gradually increases. In other words, energization is started in only the current path Xb of the current paths Xa to Xc, and energization of the other current paths Xa and Xc is not started. Therefore, the inter-electrode resistance of the current path Xb (the current path having the higher inter-electrode resistance) gradually decreases while the inter-electrode resistances of the current paths Xa and Xc (the current paths having the lower inter-electrode resistance) are held roughly at a constant value. Because the current path Xb has the smallest heater current among the current paths Xa to Xc, even when energization is started in the current path Xb earlier, effects on the other current paths (such as temperature rise in the other current paths) are relatively small.

The energization period (switch-ON period during t11 to t12) for detecting the heater currents Ia to Ic is a short amount of time (1 msec according to the present embodiment) during which the heater currents Ia to Ic can be detected and temperature change in the honeycomb body 61 does not occur.

The detection timing of the heater current and the OFF-timing of the switch may be shifted before or after For example, the heater currents Ia to Ic may be detected upon elapse of 1 msec from timing t11, whereas the switch (any of the switches 73a to 73c) is turned OFF upon elapse of 1.2 msec from timing t11.

Then, at timing t13, the second heater energization process is started. Specifically, at timing t13, all switches 73a to 73c are turned ON again (the switch 73b that is already turned ON remains turned ON). The heater currents Ia and Ic again increase at once to about Ia=5 A and Ic=4 A. The heater current Ib at this point increases to about 4 A. Then, at timing t14, the minimum current value Imin is set to 4 A based on the heater current Ib of the current path Xb of which energization has already started (of which the energization permission flag is set to "1") At this same timing t14, the heater currents Ia and Ic are compared with the minimum current value Imin (=4 A). Because the energization permission flag fc is set to "1", and the switch 73a is turned OFF. As a result, after timing t14, energization of the current path Xc is started in addition to that of the current path Xb.

Then, at timing t15, the third heater energization process is started. Specifically, at timing t15, all switches 73a to 73c are turned ON again (the switches 73b and 73c that are already turned ON remain turned ON). The heater current Ia again increases at once to about Ia=5 A. The heater currents Ib and Ic increase to about 5 A at this time. Then, at timing t16, "5 A" is stored as the minimum current value Imin based on the heater currents Ib and Ic of the current paths Xb and Xc of which energization has already started (of which the energization permission flag is set to "1") At this same timing t16, the heater current Ia is compared with the minimum current value Imin. Because Ia≤Imin, the energization permission flag fa is set to "1". As a result, at timing t16 and thereafter, a state is achieved in which energization of all current paths Xa to Xc is already performed.

As a result of the above-described third heater energization process, the honeycomb body 61 is heated in a roughly uniform manner, while achieving uniform energization energy in each current path of the honeycomb body 61.

In addition, in FIG. 8, at timings t21 to 22 that is the heating-start timing, the first heater energization process is performed. At this time, Ia=5 A, Ib=3 A, and Ic=3 A. The energization permission flags fb and fc are set to "1", the switches 73b and 73c remain turned ON, and the switch 73a is turned OFF. In other words, energization of the current paths Xb and Xc is started, and energization of the current path Xa has not been started.

Then, at timings t23 to t24, the second heater energization process is started. At this time, the heater current Ia again increases at once to about 5 A. However, because Ia≤Imin is not established at this time, energization of the current path Xa is not yet started.

Then, at timings t25 to t26, the third heater energization process is started. At this time, the heater current Ia again increases at once to about 5 A. Because Ia≤Imin is established at this time, energization of the current path Xa is started. As a result, at timing t26 and thereafter, a state is achieved in which energization, of all current paths Xa to Xc is already performed.

According to the present embodiment described in detail above, the following superior effects can be achieved.

A configuration is used in which, as the heater energization process of the honeycomb body 61, the heater currents Ia to Ic (path-specific currents) of the current paths Xa to Xc are compared and energization timing of each current path Xa to Xc is individually controlled based on the comparison results. Therefore, the energization timings of the current paths Xa to Xc can be individually controlled while suppressing variation among current paths related to internal resistance of the honeycomb body 61. Thus, even when differences in inter-electrode resistance of each current path Xa to Xc occur before heating of the honeycomb body 61 is started as a result of placement aspect of the electrodes 62, individual differences and aging in the honeycomb body 61, and the like, heating can be performed to resolve these differences after the start of heating, and temperature distribution in the honeycomb body 61 can be made uniform. Therefore, localized concentration of thermal stress in the honeycomb body 61 can be suppressed. At this time, even when high power is introduced to the honeycomb body 61 to achieve early activation, damage to the honeycomb body 61 and the like can be suppressed. As a result, the honeycomb body 61 can be uniformly heated while achieving rapid temperature rise.

During the start of heating of the honeycomb body 61, the energization start timings of the current paths Xa to Xc are individually controlled such that the current path, among the plurality of current paths Xa to Xc, that has a smaller heater current at the time of heating-start is energized first and the current paths that have a larger heater current are energized later. Therefore, immediately after heating of the honeycomb body 61 is started, the resistance value of the current path having a larger inter-electrode resistance decreases while the resistance values are maintained in the current paths having a smaller inter-electrode resistance. As a result, differences in inter-electrode resistance can be resolved after the start of heating of the honeycomb body 61 (the same applies to the differences in heater current), and temperature distribution in the honeycomb body 61 can be made uniform.

At the point where the heater current of the current path of which energization has been started first becomes the same value as that of the heater current of another current path that has not been energized, energization is started for the other current path. In this instance, after the start of the latter energization, the heater currents can be matched between the current path of which energization has been started first, and the current path of which energization has been started later.

After heating of the honeycomb body 61 is started, the heater currents Ia to Ic of the current Paths Xa to Xc detected at a predetermined detection interval (10 msecs according to the present embodiment) are compared to one another Based on the comparison results, the energization timing of each current path Xa to Xc is individually controlled. As a result, during the gradual increase of the heater current of the current path of which energization has been started first (during the gradual decrease in inter-electrode resistance), the current paths can be successively transitioned into an energized state while comparing the heater currents Ia to Ic between the current path that has already been energized and the current paths that have not yet been energized.

Heating of the honeycomb body 61 is performed after the vehicle is started by the motor 28 in the vehicle hybrid system and before the engine is started. In this configuration, early temperature rise is actualized while preventing breaking of the honeycomb structure 24 during a limited amount of time before the engine is started. Therefore, greater efficiency can be expected in reducing emission in the vehicle hybrid system.

Other Embodiments

The present invention is not limited to the description according to the above-described embodiment, and may, for example, be achieved as follows.

According to the above-described embodiment; the respective heater currents Ia to Ic of the current paths Xa to Xc are detected, and the energization timing of each current path is controlled based on the heater currents Ia to Ic. However, a configuration may instead be used in which the respective inter-electrode resistances of the current paths Xa to Xc are detected, and the energization timing of each current path is controlled based on the inter-electrode resistances. The inter-electrode resistance is calculated based on the heater currents Ia to Ic and the voltage applied at the time. Specifically, as energization control (temperature rise control of the honeycomb body 61), the respective inter-electrode resistances of the current paths Xa to Xc are detected at the start of heating, and the energization start timing of each current path Xa to Xc is individually controlled such that the current path having the larger inter-electrode resistance at the start of heating is energized first, and the current path having the smaller inter-electrode resistance is energized later. At this time, at the point where the inter-electrode resistance of the current path of which energization has been started first becomes the same value as that of the inter-electrode resistance of another current path of which energization has not yet been started, the energization of the other current path is started.

As a specific process performed by the engine ECU 50, the processes in FIG. 5 and FIG. 6 can basically be used as long as the processes reflect that detection of the heater currents Ia to Ic is replaced by detection of the inter-electrode resistances, and the resistance value decreases with energization of the honeycomb body 61.

In the current path of which energization has not yet been started, the heater current (path-specific current) and the inter-electrode resistance basically do not change. Therefore, in the second and subsequent heater energization processes, the heater currents Ia and Ic do not have to be detected (see FIG. 7 and FIG. 8). However, because even a current path that has yet to be energized may be affected by heating of the current path that has been energized first, correction taking this possibility into consideration is preferably performed.

Figure 9A:
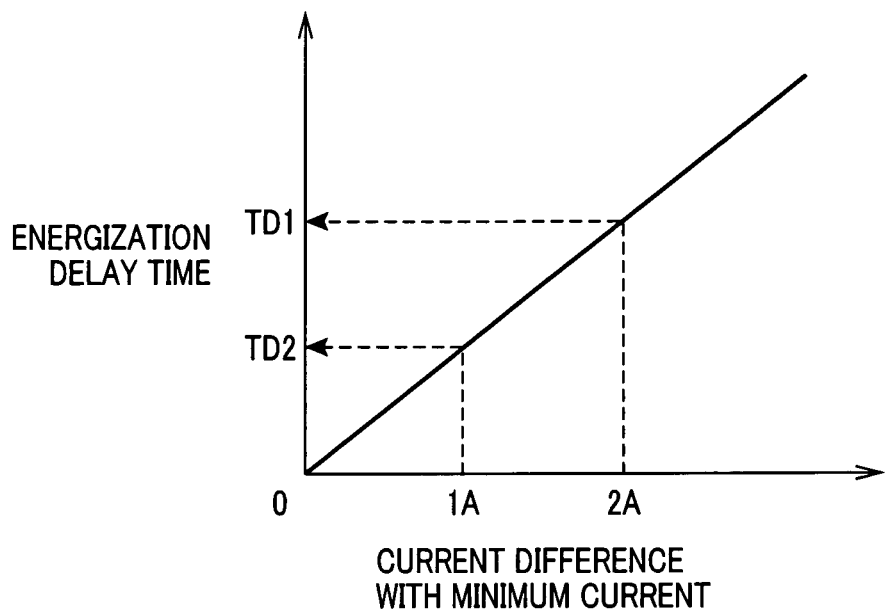
FIG. 9A is a diagram for calculating energization delay time and FIG. 9E is a time chart of another example.
Figure 9B:
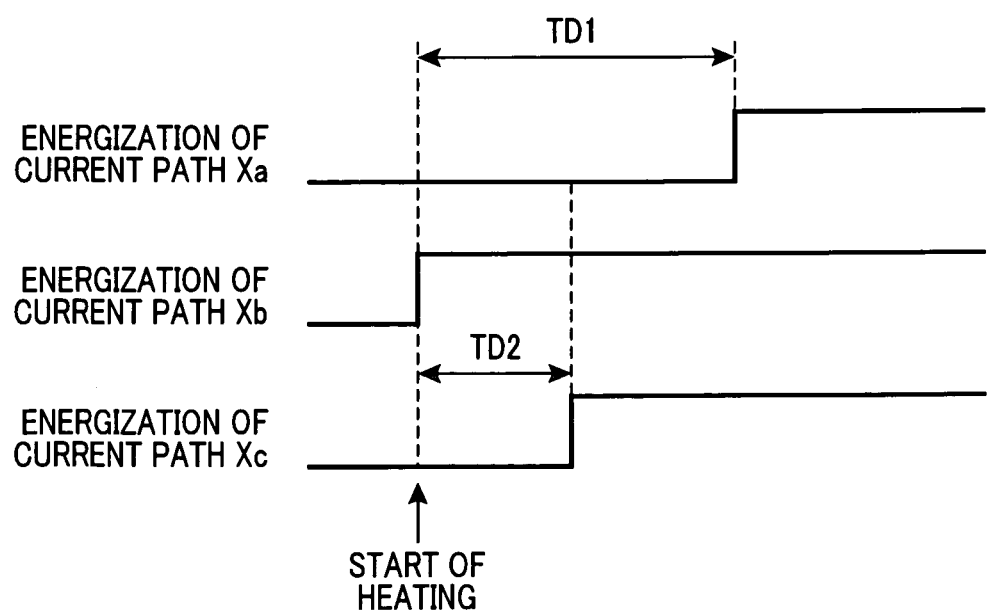

The current path of which energization is to be started first may be determined based on the differences in heater currents Ia to Ic (or inter-electrode resistances) of the current paths at the start of heating of the honeycomb body 61, and an energization delay time may be determined for the current path of which energization is started later based on the first energization-start timing. Specifically, when the respective heater currents Ia to Ic of the current paths Xa to Xc at the start of heating are, for example, (5 A, 3 A, and 4 A), the current path Xb having the smallest heater current is determined to be the current path of which energization is started first. Then, for example, based on the relationship in FIG. 9A, the engine ECU 50 calculates the energization delay time. In FIG. 9A, current difference between the minimum current that is the smallest of the heater currents Ia to Ic and the other heater currents is set as the horizontal axis, and the energization, delay time is set as the vertical axis. FIG. 9 prescribes that the greater the current difference, the greater the energization delay time is. When the minimum current is Ib=3 A, the current difference regarding the heater current Ia is "5 A−3 A=2 A" and the current difference regarding the heater current Ic is "4 A−3 A=1 A". According to FIG. 9A, the energization delay time of the current path Xa is calculated to be TD1, and the energization delay time of the current path Xc is calculated to be TD2. Then, the engine ECU 50 starts energization of the current path Xb first at the start of heating of the honeycomb body 61, and subsequently starts the energization of the current path Xc after the elapse of the energization delay time TD2, and further starts the energization of the current path Xa after the elapse of the energization delay time TD1 (see FIG. 9B).

According to the above-described configuration, the path-specific currents and the inter-electrode resistances can be matched by a simple method between the current path of which energization is started first and the current path of which energization is started later. In this instance, the path-specific current and the inter-electrode resistance of each current path are only required to be detected at the start of heating.

Figure 10C:
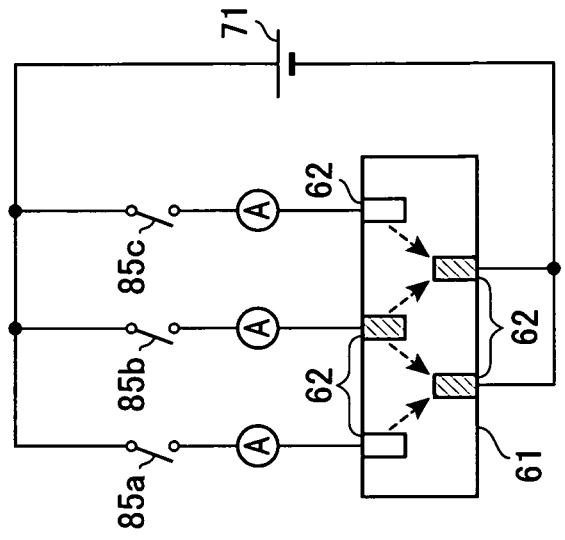
FIG. 10A to FIG. 10C are placement patterns of electrodes in the honeycomb body.
Figure 10B:
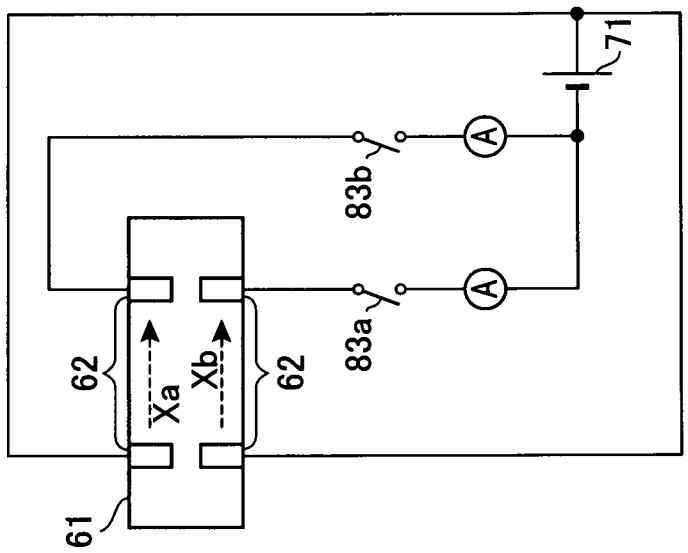
Figure 10A:
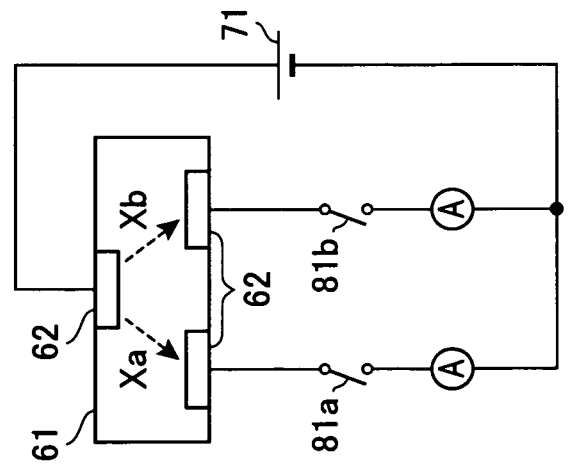

FIG. 10A to FIG. 10C are diagrams of placement patterns of the electrodes in the honeycomb body 61. In FIG. 10A to FIG. 10C, the left/right directions indicate the axial direction of the honeycomb body 61. In FIG. 10A, the plurality of electrodes 62 (three electrodes 62 in FIG. 10A) are provided such as to be shifted in the axial direction of the honeycomb body 61. The number of electrodes 62 connected to the positive side of the power supply 71 and the number of electrodes 62 connected to the negative side of the power supply 71 do not match (one electrode 62 is connected to the positive side and two electrodes 62 are connected to the negative side in FIG. 10A). In this instance, two current paths Xa and Xb are formed with the positive-side electrode as a common electrode, and switching of the current paths Xa and Xb is performed by switches 81*a* and 81*b*.

In FIG. 10B, two electrodes 62 each are provided in positions shifted in the axial direction in the honeycomb body 61. Among the electrodes 62, the two electrodes 62 closest to one axial end section of the honeycomb body 61 are connected to the positive side of the power supply 71, and the two electrodes 62 closest to the other axial end section of the honeycomb body 61 are connected to the negative side of the power supply 71. In this instance, two current paths Xa and Xb are formed along the axial direction in the honeycomb body 61, and switches 83*a* and 83*b* perform switching of the current paths Xa and Xb.

In FIG. 10C, the plurality of electrodes 62 (five electrodes 62 in FIG. 10C) are provided in positions differing from each other in the axial direction in the honeycomb body 61. The number of electrodes 62 connected to the positive side of the power supply 71 and the number of electrodes 62 connected to the negative side do not match (three electrodes 62 are connected to the positive side and two electrodes 62 are connected to the negative side in FIG. 10C). Four current paths are formed in the honeycomb body 61. The electrode 62, among the positive-side electrodes, that is in a position sandwiched between the negative side electrodes when viewed from the axial direction (the shaded electrode 62 in FIG. 10C) and the electrodes 62, among the negative-side electrodes, that are in positions sandwiched between the positive-side electrodes when viewed from the axial direction (the shaded electrodes 62 in FIG. 10C) are common electrodes shared among the plurality of current paths. Switches 85*a*, 85*b*, and 85*c* perform switching of the current paths in the honeycomb body 61.

In the configurations in FIG. 10A to FIG. 10C as well, in a manner similar to that described above, the path-specific current flowing when a predetermined voltage is applied or the inter-electrode resistance for each of the plurality of current paths is detected. The path-specific current or inter-electrode resistance of each current path is compared with one another, and the energization timing of each current path is individually controlled based on the comparison results.

For example, in the configuration in FIG. 10B, a plurality of current paths extending in the axial direction are formed when energization is performed in the axial direction of the honeycomb body 61 (when axial-direction energization is performed). However, portions through which current does not easily flow (in other words, portions that are not easily heated) are formed, such as between the current paths, resulting in temperature difference in the radial direction. In addition, a similar situation is considered to occur when energization is performed in the radial direction of the honeycomb body 61 (when radial-direction energization is performed), resulting in temperature difference in the axial direction. As reasons for the variation in heating, placement of the electrodes, the number and positions of the current paths, and the like can be considered. Therefore, a configuration enabling switching between axial-direction energization and radial-direction energization is used.

Figure 11A:
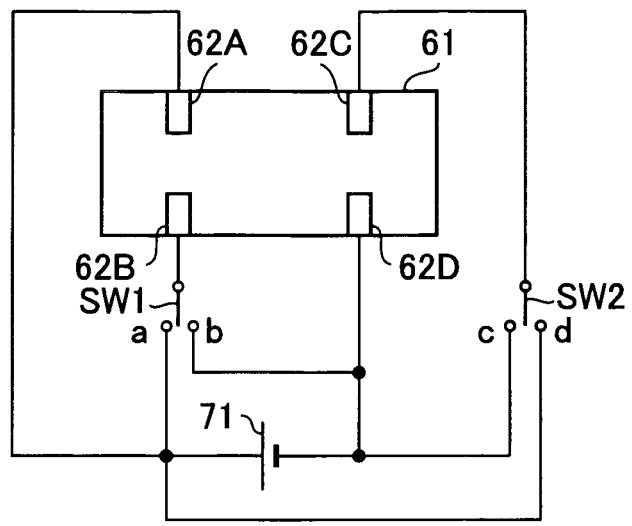
FIG. 11A to FIG. 11C are diagrams of placement positions of electrodes and electrical circuits in the honeycomb body.
Figure 11B:
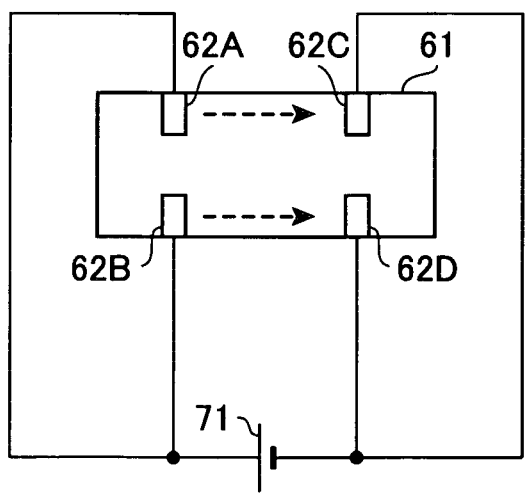
Figure 11C:
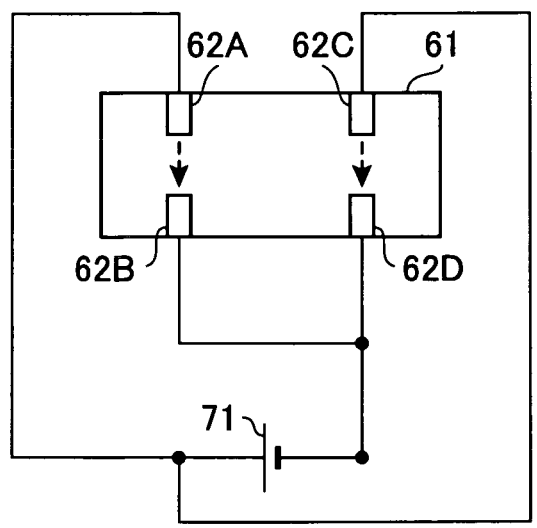

FIG. 11A to FIG. 11C are diagrams of placement positions of the electrodes in the honeycomb body 61, and electrical circuits. In FIG. 11A to FIG. 11C, the left/right directions indicate the axial direction of the honeycomb body 61.

As shown in FIG. 11A, two electrodes 62 each are provided in two positions apart from each other in the axial direction in the honeycomb body 61. In FIG. 11A, the electrodes 62 are respectively electrodes 62A, 62B, 62C, and 62D. The electrode 62A is connected to the positive side of the power supply 71. The electrode 62B is connected to a switch SW1. Of the two switching points a and b of the switch SW1, a is connected to the positive side of the power supply 71 and the b is connected to the negative side of the power supply 71. The electrode 62C is connected to a switch SW2. Of the two switching points c and d of the switch SW2, c is connected to the negative side of the power supply 71 and the d is connected to the positive side of the power supply 71. The electrode 62D is connected to the negative side of the power supply 71. Each switch SW1 and SW2 can be switched accordingly by control signals from a control device (not shown).

According to the above-described configuration, switching between axial-direction energization and radial-direction energization can be performed by switching of the switches SW1 and SW2. Specifically, as shown in FIG. 11B, when SW1=a and SW2=c, two current paths are formed along the axial direction, and current flows from the electrode 62A to the electrode 62C and from the electrode 625 to the electrode 62D. As a result, axial-direction energization is performed (the current paths at this time are equivalent to a first current path). In addition, as shown in FIG. 11C, when SW1=b and SW2=d, two current paths are formed along the radial direction, and current flows from the electrode 62A to the electrode 62B and from the electrode 62C to the electrode 62D. As a result, radial-direction energization is performed (the current paths at this time are equivalent to a second current path).

In short, the current paths during axial-direction energization and the current paths during radial-direction energization intersect with each other, and according to the present embodiment in particular, are current paths that are perpendicular to each other. The current paths extending in mutually intersecting directions are switched to the current paths to be energized.

The switching process between axial-direction energization and radial-direction energization is performed by a control device (such as the engine ECU 50). For example, the control device switches between axial-direction energization and radial-direction energization at a predetermined time interval. In this instance, the energization, periods of axial-direction energization and radial-direction energization may be the same duration, or may be different durations. For example, the energization period of a single axial-direction energization operation may be longer than the energization period of a single radial-direction energization operation (or vice versa).

Axial-direction energization and radial-direction energization may be used depending on whether heating is Performed from a cooled state or heating is performed to maintain temperature after activation is completed. For example, axial-direction energization is performed for heating from a cooled state, and radial-direction energization is performed for heating to maintain temperature after activation is completed (or vice versa).

According to the above-described configuration, because the current paths to be energized are switched among the plurality of current paths extending in mutually intersecting directions, portions through which current does not easily flow (in other words, portions that are not easily heated) in the honeycomb body 61 are not easily formed. As a result, the honeycomb body 61 can be uniformly heated. According to the present embodiment in particular, switching of the current paths is performed between the currents paths extending in the axial direction of the honeycomb body 61 and the current paths extending in the direction intersecting the axial direction. Therefore, in the honeycomb body 61 forming a columnar shape, portions through which current does not easily flow (or in other words, portions that are not easily heated) are eliminated, and uniform heating of the overall honeycomb can be achieved.

In the configuration in which switching is performed between axial-direction energization and radial-direction energization as described above, the heater currents (path-specific currents) of the plurality of current paths may be compared, and the energization timing for each current path may be individually controlled based on the comparison results. In other words, during axial-direction energization, the energization timing of each current path used at this time may be individually controlled, and during radial-direction energization, the energization timing of each current path used at this time may be individually controlled.

The number of current paths during axial-direction energization and the number of current paths during radial-direction energization are not required to be the same. A configuration in which the number of current paths during axial-direction energization is greater or a configuration in which the number of current paths during radial-direction energization is greater may be used. The two current paths may be formed by selective use of common electrodes as shown in FIG. 11A to FIG. 11C, or by dedicated electrodes for axial-direction energization and dedicated electrodes for radial-direction energization may be provided.

In the configuration in which switching is performed between axial-direction energization and radial-direction energization, the current paths extending in mutually intersecting directions may intersect in a state other than the perpendicular state. The plurality of current paths may extend in three directions and intersect with one another.

In the honeycomb structure, in addition to the plurality of electrodes 62 being provided on the surface of the honeycomb body 61 (base material), the plurality of electrodes 62 may be provided embedded within the honeycomb body 61 (base material).

As the base material of the honeycomb structure, a configuration may be used in which a base material having positive temperature coefficient (PTC) characteristics is used, rather than that having NTC characteristics. When the base material having PTC characteristics is used, the energization timing of each current path is individually controlled such that, among the plurality of current paths, the current path having a larger path-specific current at the start of heating is energized first and the current path having a smaller path-specific current is energized later, or the current path having a smaller inter-electrode resistance at the start of heating is energized first and the current path having a larger inter-electrode resistance is energized later, because the internal resistance gradually increases as the temperature rises with the start of energization. In this configuration as well, heating can be performed to resolve the difference in inter-electrode resistance among the current paths after the start of heating of the honeycomb body, and temperature distribution in the honeycomb body can be made uniform.

The honeycomb body serving as the base material may have a rectangular columnar shape, in addition to the circular columnar shape. Furthermore, the end surface of the honeycomb body may have a polygonal shape that is a pentagon or a shape having more than five sides, in addition to a rectangle. Furthermore, the opening shape of the cell may be that other than a rectangle, and may be a polygonal shape such as a hexagon.

What is claimed is:

1. An electrical heating catalyzer comprising:
    a honeycomb structure having a base material made of conductive ceramic and a plurality of pairs of electrodes in the base material of which each pair is provided apart from one another;
    an energizer for energizing each of a plurality of current paths formed by the plurality of electrodes in the base material, to heat the base material;
    a detector for detecting a path-specific current that flows when a predetermined voltage is applied or an inter-electrode resistance in the base material, for each of the plurality of current paths;
    a comparator for comparing the path-specific current or the inter-electrode resistance detected by the detector for each current path; and
    an energization controller for controlling an energization timing of each current path based on a comparison result which is compared by the comparator; wherein:
    the base material is made of a ceramic having negative temperature coefficient characteristics;
    the detector is configured to detect the path-specific current or the inter-electrode resistance at a heating-start timing at which heating of the base material is started; and
    the energization controller is configured to control an energization-start timing of each current path such that, among the plurality of current paths, a current path having a smaller path-specific current at the heating-start timing is energized first and a current path having a larger path-specific current is energized later, or a current path having a larger inter-electrode resistance at the heating-start timing is energized first and a current path having a smaller inter-electrode resistance is energized later.

2. The electrical heating catalyzer according to claim 1, wherein the energization controller, at a point where the path-specific current or the inter-electrode resistance of the current path of which energization has been started first becomes a same value as that of a path-specific current or a inter-electrode resistance of another current path of which energization has not been started, starts energization of the other current path.

3. The electrical heating catalyzer according to claim 2, wherein:
    the energization controller, based on a difference in path-specific current or inter-electrode resistance among the current paths at the heating-start timing, decides a current path of which energization is to be started first, and decides an energization delay time for the current path of which energization is to be started later, based on a timing of the energization that is started first.

4. The electrical heating catalyzer according to claim 2, wherein:
    the detector is configured to detect the path-specific current or the inter-electrode resistance for each of the plurality of current paths at a predetermined detection interval after heating of the base material has been started;
    the comparator is configured to compare the path-specific currents or the inter-electrode resistances detected at each predetermined detection interval; and
    the energization controller is configured to control the energization timing of each current path based on a comparison result which is compared by the comparator.

5. The electrical heating catalyzer according to claim 2, wherein the detector, when detecting the path-specific current, detects the path-specific current by energizing each current path for an energization period during which the path-specific current can be detected and temperature change in the base material does not occur.

6. The electrical heating catalyzer according to claim 1, wherein:
    the energization controller, based on a difference in path-specific current or inter-electrode resistance among the current paths at the heating-start timing, decides a current path of which energization is to be started first, and decides an energization delay time for the current path of which energization is to be started later, based on a timing of the energization that is started first.

7. The electrical heating catalyzer according to claim 6, wherein;
    the detector is configured to detect the path-specific current or the inter-electrode resistance for each of the plurality of current paths at a predetermined detection interval after heating of the base material has been started;
    the comparator is configured to compare the path-specific currents or the inter-electrode resistances detected at each predetermined detection interval; and
    the energization controller is configured to control the energization timing of each current path based on a comparison result which is compared by the comparator.

8. The electrical heating catalyzer according to claim 6, wherein the detector, when detecting the path-specific current, detects the path-specific current by energizing each current path for an energization period during which the path-specific current can be detected and temperature change in the base material does not occur.

9. The electrical heating catalyzer according to claim 1, wherein:
    the detector is configured to detect the path-specific current or the inter-electrode resistance for each of the plurality of current paths at a predetermined detection interval after heating of the base material has been started;

the comparator is configured to compare the path-specific currents or the inter-electrode resistances detected at each predetermined detection interval; and the energization controller is configured to control the energization timing of each current path based on a comparison result which is compared by the comparator.

10. The electrical heating catalyzer according to claim 1, wherein the detector, when detecting the path-specific current, detects the path-specific current by energizing each current path for an energization period during which the path-specific current can be detected and temperature change in the base material does not occur.

11. An electrical heating catalyzer comprising:
a honeycomb structure having a base material made of conductive ceramic and a plurality of pairs of electrodes in the base material of which each pair is provided apart from one another;
an energizer for energizing each of a plurality of current paths formed by the plurality of electrodes in the base material, to heat the base material;
a detector for detecting a path-specific current that flows when a predetermined voltage is applied or an inter-electrode resistance in the base material, for each of the plurality of current paths;
a comparator for comparing the path-specific current or the inter-electrode resistance detected by the detector for each current path; and
an energization controller for controlling an energization timing of each current path based on a comparison result which is compared by the comparator; wherein:
the detector is configured to detect the path-specific current or the inter-electrode resistance for each of the plurality of current paths at a predetermined detection interval after heating of the base material has been started;
the comparator is configured to compare the path-specific currents or the inter-electrode resistances detected at each predetermined detection interval; and
the energization controller is configured to control the energization timing of each current path based on a comparison result which is compared by the comparator.

12. The electrical heating catalyzer according to claim 11, wherein the detector, when detecting the path-specific current, detects the path-specific current by energizing each current path for an energization period during which the path-specific current can be detected and temperature change in the base material does not occur.

13. An electrical heating catalyzer comprising:
a honeycomb structure having a base material made of conductive ceramic and a plurality of pairs of electrodes in the base material of which each pair is provided apart from one another;
an energizer for energizing each of a plurality of current paths formed by the plurality of electrodes in the base material, to heat the base material;
a detector for detecting a path-specific current that flows when a predetermined voltage is applied or an inter-electrode resistance in the base material, for each of the plurality of current paths;
a comparator for comparing the path-specific current or the inter-electrode resistance detected by the detector for each current path; and
an energization controller for controlling an energization timing of each current path based on a comparison result which is compared by the comparator; wherein:
the detector, when detecting the path-specific current, detects the path-specific current by energizing each current path for an energization period during which the path-specific current can be detected and temperature change in the base material does not occur.

14. An electrical heating catalyzer comprising:
a honeycomb structure having a base material made of conductive ceramic and a plurality of pairs of electrodes in the base material of which each pair is provided apart from one another;
an energizer for energizing each of a plurality of current paths formed by the plurality of electrodes in the base material, to heat the base material;
a detector for detecting a path-specific current that flows when a predetermined voltage is applied or an inter-electrode resistance in the base material, for each of the plurality of current paths;
a comparator for comparing the path-specific current or the inter-electrode resistance detected by the detector for each current path; and
an energization controller for controlling an energization timing of each current path based on a comparison result which is compared by the comparator; wherein:
the electrical heating catalyzer is applied to a vehicle hybrid system including a motor and an engine as power sources, and the honeycomb structure is provided in an exhaust system of the engine; and
the energization controller is configured to perform heating of the base material during a period after a vehicle is started by the motor and before the engine is started.

15. An electrical heating catalyzer including a honeycomb structure having a base material made of conductive ceramic and a plurality of electrodes provided apart from one another in the base material, and an energizer for energizing each of a plurality of current paths formed by the plurality of electrodes in the base material, in which the base material is heated by energization of the plurality of current paths, the electrical heating catalyzer wherein:
the plurality of current paths are configured to include current paths extending in mutually intersecting directions; and
the electrical heating catalyzer includes a switching controller for performing switching of a current path to be energized at each time among the current paths extending in mutually intersecting directions; wherein:
the base material is formed into a circular columnar shape;
the plurality of current paths include a first current path extending in an axial direction of the base material and a second current path extending in a radial direction of the base material, as the current paths extending in mutually intersecting directions; and
the switching controller is configured to switch the current path to be energized each time between the first current path and the second current path.

\* \* \* \* \*